(12) United States Patent
Taniguchi

(10) Patent No.: US 8,070,967 B2
(45) Date of Patent: Dec. 6, 2011

(54) METHOD FOR MANUFACTURING PATTERNED MAGNETIC RECORDING MEDIUM

(75) Inventor: Katsumi Taniguchi, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 395 days.

(21) Appl. No.: 12/352,224

(22) Filed: Jan. 12, 2009

(65) Prior Publication Data
US 2009/0181264 A1    Jul. 16, 2009

(30) Foreign Application Priority Data

Jan. 10, 2008  (JP) ................. 2008-003446

(51) Int. Cl.
*B44C 1/22* (2006.01)
*B23P 15/00* (2006.01)
*C03C 15/00* (2006.01)
(52) U.S. Cl. ............... 216/22; 216/39; 216/44
(58) Field of Classification Search .......... 216/22, 216/39, 44
See application file for complete search history.

(56) References Cited

U.S. PATENT DOCUMENTS

| 7,470,374 | B2 | 12/2008 | Hattori et al. |
| 2005/0284842 | A1 | 12/2005 | Okawa et al. |
| 2005/0287397 | A1 | 12/2005 | Soeno et al. |
| 2006/0292400 | A1* | 12/2006 | Suwa et al. ............ 428/826 |

FOREIGN PATENT DOCUMENTS

| CN | 1713277 A | 12/2005 |
| JP | 2005-50468 A | 2/2005 |
| JP | 2006-12285 A | 1/2006 |

OTHER PUBLICATIONS

Notice of First Office Action dated Aug. 1, 2011 issued in corresponding Chinese patent application No. 200910000287.7, partial English Translation is provided.

* cited by examiner

*Primary Examiner* — Binh X Tran
*Assistant Examiner* — Thomas Pham
(74) *Attorney, Agent, or Firm* — Rossi, Kimms & McDowell LLP

(57) ABSTRACT

A method for manufacturing a patterned magnetic recording medium that allows processing only required sites with high precision, in a dry etching process during formation of an uneven pattern in an interlayer. The method includes forming sequentially, on a substrate, a soft magnetic layer, an etching stop layer, a seed layer, an interlayer, a hard mask layer and a resist; obtaining a resist pattern by patterning the resist; obtaining a patterned hard mask layer by etching the hard mask layer using the resist pattern as a mask; stripping the resist pattern; obtaining a patterned interlayer by etching the interlayer using the patterned hard mask layer as a mask; stripping the patterned hard mask layer; and forming a magnetic recording layer by forming a perpendicular orientation section on the patterned interlayer, and forming a random orientation section on the seed layer.

10 Claims, 1 Drawing Sheet

FIG. 1
FIG. 1A
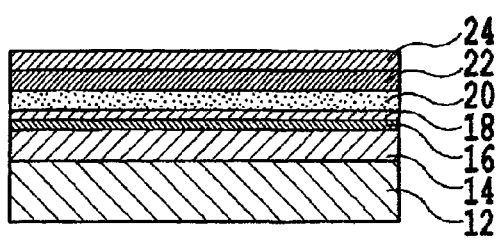
FIG. 1E
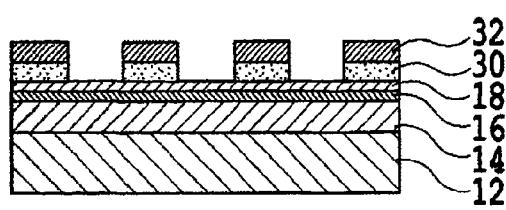
FIG. 1B
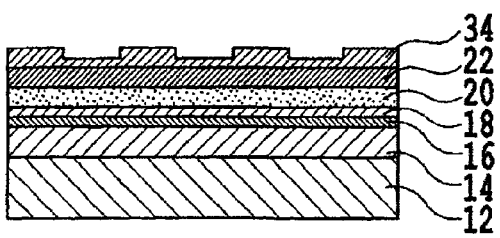
FIG. 1F
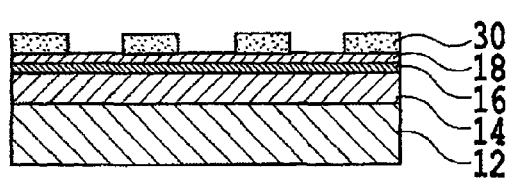
FIG. 1C
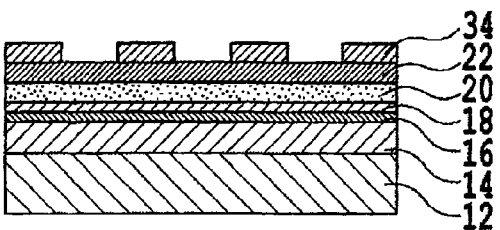
FIG. 1G
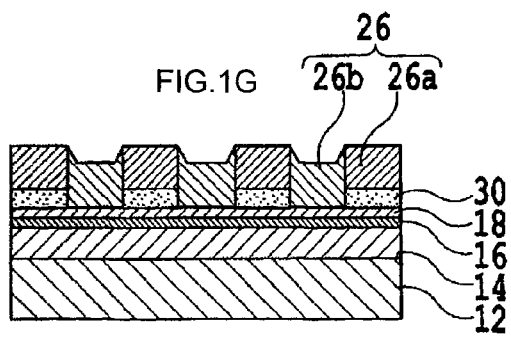
FIG. 1D
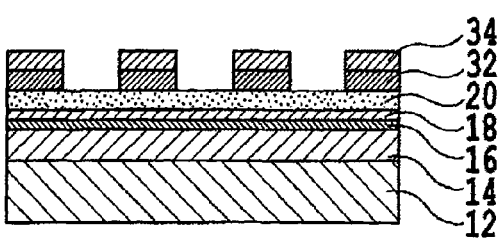
FIG. 1H
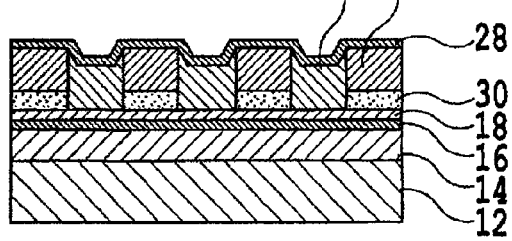

METHOD FOR MANUFACTURING PATTERNED MAGNETIC RECORDING MEDIUM

BACKGROUND OF THE INVENTION

The present invention relates to a method for manufacturing a patterned magnetic recording medium. More particularly, the present invention relates to a method for manufacturing a patterned magnetic recording medium that allows forming an uneven pattern in an interlayer only at required sites with high precision, while realizing excellent recording density in the medium.

Various approaches have been tried to increase the recording density in magnetic recording media such as hard disks or the like. These include, for instance, optimizing materials used in the various constituent members, using finer particles in recording layers, head miniaturization, and adopting perpendicular magnetic recording. These approaches, however, are reaching their limits in terms of enhancing recording density.

With a view to further increasing recording density, therefore, there have been proposed technologies relating to so-called patterned magnetic recording media, such as discrete track media or bit patterned media, in which a fine uneven pattern is worked into a magnetic recording layer.

For example, Japanese Patent Application Laid-open No. 2006-12285 (corresponding to US 2005287397 A1) discloses a recording medium comprising a substrate; a soft magnetic layer formed on the substrate; a recording layer oriented in such a manner so as to have magnetic anisotropy in a direction perpendicular to the surface, formed on the soft magnetic layer, and divided into multiple recording elements in a predetermined uneven pattern; and an interlayer formed between the recording layer and the soft magnetic layer; wherein the recording elements are formed to have a predetermined track shape in a data region.

Japanese Patent Application Laid-open No. 2006-12285 discloses also the feature to the effect that at least part of the intermediate layer in a thickness direction is an orientation film that has properties of enhancing orientability of the recording layer, the orientation film being formed in contact with the recording layer on the substrate side of the recording layer.

Japanese Patent Application Laid-open No. 2006-12285 discloses moreover the feature to the effect that at least part of the intermediate layer in a thickness direction is an etch stop film having a lower etching rate than the recording layer, for a predetermined etching process.

Japanese Patent Application Laid-open No. 2005-50468 (corresponding to US 2006021966 A1) discloses a method for manufacturing a magnetic recording medium, comprising a resist layer processing step of processing a resist layer of an object to be processed to a predetermined pattern shape, the object being obtained by sequentially forming, on a substrate surface, a continuous recording layer, a mask layer and the resist layer; a mask layer processing step of processing the mask layer to the pattern shape, on the basis of the resist layer; a resist layer removal step of removing the resist layer on the mask layer; and a continuous recording layer processing step of processing the continuous recording layer to the above pattern shape, by dry etching based on the mask layer, to divide the continuous recording layer into multiple divided recording elements, wherein the resist layer removal step is performed before the continuous recording layer processing step.

The structures below are conceivable structures for a patterned magnetic recording medium. Specifically, a conceivable structure may comprise a predetermined fine uneven pattern being formed on an interlayer for controlling magnetic domains in a magnetic recording layer, with a granular film being formed over the entire surface of the uneven pattern, and a magnetic recording layer, having magnetic domains oriented in the perpendicular direction, being formed only at the surface of protrusions of unprocessed portions of the interlayer, the protrusions having crystal orientation. Herein, a material containing Ru may be used in the interlayer, the fine uneven pattern may be formed by dry etching or the like, and Co alloy-$SiO_2$ may be used as the granular film.

A desired uneven pattern in the interlayer of such a patterned magnetic recording medium may ordinarily be formed in accordance with a procedure as follows. Firstly, a hard mask layer is formed on the interlayer. Next, a resist is coated onto the hard mask layer, and then the resist is pre-cured, is patterned by nano-imprinting, electron beam exposure or the like, and is cured, to yield a resist pattern. Using this resist pattern, the hard mask is then dry-etched by, for instance, ion beam or reactive ion etching. After stripping of the resist pattern, the exposed surface of the interlayer at portions where the hard mask has been etched is processed by dry etching, for instance, by ion beam or reactive ion etching.

When forming a desired uneven pattern on an interlayer in accordance with the above procedure, the thickness of the interlayer ranges ordinarily from 1 to 20 nm. The interlayer, therefore, is extremely thin, and thus processing may progress down into the soft magnetic layer, below the interlayer, during the step of forming an uneven pattern through dry-etching of the interlayer by ion beam etching, reactive ion etching or the like.

When processing progresses into the soft magnetic layer, the latter is corroded by residues of the reactive gas. This may preclude fully bringing out the inherent characteristics of the soft magnetic layer, namely "to suppress spreading of the magnetic flux generated by the head during recording and to secure sufficient magnetic field in the perpendicular direction". Such progress results in an excessively large stepped pattern after formation of the magnetic recording layer and the protective layer. Upon filling the recesses of the magnetic recording layer with a non-magnetic material, therefore, it becomes difficult to achieve a flat magnetic recording medium, on account of the resulting filling surface.

The same undesirable effects are encountered when processing the interlayer using the resist pattern alone, employing no hard mask layer.

It is thus extremely difficult to control the depth of the interlayer, down to nanometer units, by dry etching. As a result, even if exposure of the surface of the soft magnetic layer can be detected by plasma emission spectroscopy or the like, processing is still very likely to advance into the soft magnetic layer, unless the level of the recess surface is made highly homogeneous during processing of the interlayer.

Although various technologies relating to patterned magnetic recording media have been proposed, as described above, there is still a need for a manufacturing method of such media in which only necessary sites are processed, with high precision, in a dry etching process during formation of an uneven pattern in an interlayer.

Accordingly, it would be desirable to provide a method for manufacturing a patterned magnetic recording medium that allows forming an interlayer uneven pattern only at required sites, with high precision, while realizing excellent recording density in the medium.

SUMMARY OF THE INVENTION

The present invention relates to a method for manufacturing a patterned magnetic recording medium, the method having the steps of forming sequentially, on a substrate, a soft magnetic layer, an etching stop layer, a seed layer, an interlayer, a hard mask layer and a resist; obtaining a resist pattern by patterning the resist; obtaining a patterned hard mask layer by etching the hard mask layer using the resist pattern as a mask; stripping the resist pattern; obtaining a patterned interlayer by etching the interlayer using the patterned hard mask layer as a mask; stripping the patterned hard mask layer; and forming a magnetic recording layer by forming a perpendicular orientation section on the patterned interlayer and forming a random orientation section on the seed layer. The method for manufacturing a patterned magnetic recording medium of the present invention is used for manufacturing a magnetic recording medium such as high-recording density hard disks.

In such a method for manufacturing a patterned magnetic recording medium, a non-magnetic material and/or an amorphous material is preferably used in the etching stop layer.

When the interlayer is etched by ion beam etching, the material of the etching stop layer is preferably a material having a lower sputtering yield than a material of the interlayer. When the interlayer is etched by reactive ion etching, the material of the interlayer is preferably a non-magnetic material resistant to a reactive gas. Preferably, the thickness of the etching stop layer is no greater than 10 nm.

In the above manufacturing method the resist may be patterned by electron beam exposure or imprinting. The manufacturing method may further has a step of forming a protective layer on the magnetic recording layer.

In the above manufacturing method, moreover, dry etching may be used to etch at least one of the hard mask layer and the interlayer. When stripping of the resist pattern and etching of the interlayer are carried out simultaneously, a material comprising Ru may be used in the interlayer, and an $O_2$ gas plasma may be used in the above etching.

In the method for manufacturing a patterned magnetic recording medium of the present invention, it becomes possible to process only required sites of the interlayer, with high precision, by interposing the etching stop layer between the soft magnetic layer and the seed layer. As a result, an uneven pattern can also be effectively formed, with high precision, on the magnetic recording layer that is positioned above the interlayer. In the above manufacturing method, etching does not progress into the soft magnetic layer. This allows, as a result, fully bringing out the inherent characteristics of the soft magnetic layer, namely "to suppress spreading of the magnetic flux generated by the head during recording and to secure sufficient magnetic field in the perpendicular direction". Thanks to the above effects, the manufacturing method of the present invention allows realizing excellent recording density in a magnetic recording medium.

Moreover, the magnetic characteristics of the magnetic recording medium are not negatively affected when using a non-magnetic material as the etching stop layer, and thus the etching stop layer need not be removed later. This allows simplifying the manufacture of the medium as a whole.

BRIEF DESCRIPTION OF THE DRAWINGS

The invention will be described with reference to certain preferred embodiments thereof and the accompanying drawings, wherein: FIGS. 1A to 1H are a set of cross-sectional schematic diagrams illustrating various steps of an example of a method for manufacturing a patterned magnetic recording medium of the present invention, FIG. 1A illustrating a first step, FIGS. 1B and 1C illustrating a second step, FIG. 1D illustrating a third step, FIG. 1E illustrating a fourth and fifth step, FIG. 1F illustrating a sixth step, FIG. 1G illustrating a seventh step, and FIG. 1H illustrating an optional step of forming a protective layer.

DESCRIPTION OF THE PREFERRED EMBODIMENTS

A method for manufacturing a patterned magnetic recording medium of the present invention is explained in detail below. The examples below are merely illustrative in nature, and can accommodate any design modifications within the ordinary creative ability of a person skilled in the art.

The method for manufacturing a patterned magnetic recording medium of the present invention includes: a step of forming sequentially, on a substrate, a soft magnetic layer, an etching stop layer, a seed layer, an interlayer, a hard mask layer and a resist (hereinafter, "first step"); a step of obtaining a resist pattern by patterning the resist (hereinafter, "second step"); a step of obtaining a patterned hard mask layer by etching the hard mask layer using the resist pattern as a mask (hereinafter, "third step"); a step of stripping the resist pattern (hereinafter, "fourth step"); a step of obtaining a patterned interlayer by etching the interlayer using the patterned hard mask layer as a mask (hereinafter, "fifth step"); a step of stripping the patterned hard mask layer (hereinafter, "sixth step"); and a step of forming a magnetic recording layer by forming perpendicular orientation sections on the patterned interlayer and forming random orientation sections on the seed layer (hereinafter, "seventh step").

FIGS. 1A to 1H are a set of cross-sectional schematic diagrams illustrating various steps of an example of the method for manufacturing the patterned magnetic recording medium of the present invention. Specifically, FIG. 1A illustrates the first step, FIGS. 1B and 1C illustrate the second step, FIG. 1D illustrates the third step, FIG. 1E illustrates the fourth and fifth step, FIG. 1F illustrates the sixth step, FIG. 1G illustrates the seventh step, and FIG. 1H illustrates an optional step of forming a protective layer (eighth step). Each step is explained below.

As illustrated in FIG. 1A, the first step is a step of sequentially forming, on a substrate 12, a soft magnetic layer 14, an etching stop layer 16, a seed layer 18, an interlayer 20, a hard mask layer 22 and a resist 24.

As for the substrate 12, there can be used a material ordinarily employed as a substrate of magnetic recording media. Examples thereof include, for instance, a material comprising any among aluminum, glass and silicon. As the material comprising aluminum there can be used a NiP-plated Al alloy. As the glass material there can be used, for instance, tempered glass or crystallized glass. As the material containing silicon there can be used a silicon substrate and a silicon carbide substrate. The thickness of the substrate 12, which is adjusted in accordance with the size of the substrate, ranges preferably from 0.3 to 1.3 mm.

The substrate 12 comprising the above materials is cleaned. Such cleaning may involve solution cleaning, using a highly effective predetermined chemical such as an acid or an alkali, as a method for removing a natural oxide film, and also dry cleaning using various ions or plasma. Dry cleaning is particularly preferred, in terms of, for instance, increasing the precision of design dimensions, treatment of waste resulting from the used chemicals, and automation of the cleaning process.

The role of the soft magnetic layer 14 is to suppress spreading of the magnetic flux generated by the head during recording, and to secure sufficient magnetic field in the perpendicular direction. As the material of the soft magnetic layer 14 there can be used, for instance, a Ni alloy, a Fe alloy and a Co alloy. Good electromagnetic conversion characteristics can be achieved by using, for instance, amorphous CoZrNb, CoTaZr, CoTaZrNb, CoFeNb, CoFeZrNb and CoFeTaZrNb. In consideration of the structure of the magnetic head used for recording, and from the viewpoint of productivity, the thickness of the soft magnetic layer 14 ranges preferably from 5 nm to 100 nm. A film thickness of 5 nm or greater allows effectively suppressing magnetic flux spreading. Also, excellent productivity can be achieved by keeping the film thickness no greater than 100 nm.

The cleaned substrate 12 is loaded into a sputtering device. The soft magnetic layer 14 is formed then by various sputtering methods, using a predetermined target. The method used may be, for instance, DC magnetron sputtering. In this case, preferably, the atmosphere in the sputtering device is an argon atmosphere, the pressure in the device ranges from 0.7 to 1.5 Pa, the temperature in the device is a non-heating temperature, the film formation rate is 2 to 10 nm/second, and the distance between the target and the substrate is 5 to 15 cm.

The etching stop layer 16 is a layer for preventing that the soft magnetic layer 14 be etched in a dry etching process during formation of an uneven pattern in the interlayer 20 (described below) that is formed on the etching stop layer 16.

A non-magnetic material is preferably used as the material of the etching stop layer 16, from the viewpoint of avoiding influencing the magnetic relationship between the soft magnetic layer 14 and the magnetic recording layer. Specific non-magnetic materials that can be used include, for instance, Si, Ti, Zr, Mo, Ta or W.

Also, an amorphous material is preferably used as the material of the etching stop layer 16, from the viewpoint of avoiding influencing negatively the orientation of the magnetic recording layer. The crystal orientability of the below-described seed layer 18 and interlayer 20 is not negatively influenced by the etching stop layer 16 when using, for example, an amorphous non-magnetic material in the etching stop layer 16, and thus excellent crystal orientability can be achieved in the below-described magnetic recording layer 26.

When the below-described interlayer 20 is etched by ion beam etching using an inert gas such as Ar, the non-magnetic material used in the etching stop layer 16 is preferably a material having a lower sputtering yield than the interlayer 20, and more preferably also an insulating material. The sputtering yield is a value defined as the number of atoms (or molecules) ejected per incident ion. Materials having low sputtering yield include, for instance, $SiO_2$, $TiO_2$ and $GeO_2$.

When the interlayer 20 comprising, for instance, Ru, is etched by reactive ion etching, the non-magnetic material of the etching stop layer 16 can be an insulating material such as $SiO_2$ or $TiO_2$. In this case there can also be used a material, such as a eutectic composition alloy of non-magnetic metals, having considerable resistance to $O_2$-type gas plasma or the like that is used for processing Ru.

The thickness of the etching stop layer 16 is preferably no greater than 10 nm, in terms of avoiding influencing the magnetic relationship between the soft magnetic layer and the magnetic recording layer.

The etching stop layer 16 is formed by various sputtering methods using a predetermined target. The method used may be, for instance, DC magnetron sputtering. In this case, preferably, the atmosphere in the sputtering device is an argon atmosphere, the pressure in the device ranges from 0.5 to 2 Pa, the temperature in the device is a non-heating temperature, the film formation rate is 1 to 5 nm/second, and the distance between the target and the substrate is 5 to 15 cm.

The role of the seed layer 18 is to control the orientability and particle size of the interlayer 20 that is formed on the seed layer 18, and by extension the orientability and average particle size of the magnetic recording layer 26. To achieve this goal, the seed layer 18 uses preferably a material having an fcc structure or an hcp structure. The material used may be, for instance, NiFeAl, NiFeSi, NiFeNb, NiFeB, NiFeNbB, NiFeMo, NiFeCr, CoNiFe or CoNiFeB. The thickness of the seed layer 18 is suitably adjusted so as to achieve desired values of magnetic characteristics and electromagnetic conversion characteristics in the final magnetic recording layer 26, and ranges preferably from 2 nm to 5 nm. Impairment of the orientability of the interlayer 20, and thus of the magnetic recording layer 26, can be suppressed by making the thickness of the seed layer 18 no smaller than 2 nm. Meanwhile, setting the thickness of the seed layer 18 to be no greater than 5 nm causes the particle size of the seed layer 18 to be not excessively large, which allows achieving a finer particle size in the magnetic recording layer 26, via the interlayer 20, while suppressing impairment of electromagnetic conversion characteristics.

The seed layer 18 is formed on the etching stop layer 16 by various sputtering methods, using a predetermined target. The method used may be, for instance, DC magnetron sputtering. In this case, preferably, the atmosphere in the sputtering device is an argon atmosphere, the pressure in the device ranges from 0.7 to 2 Pa, the temperature in the device is a non-heating temperature, the film formation rate is 2 to 10 nm/second, and the distance between the target and the substrate is 5 to 15 cm.

The interlayer 20 is a non-magnetic layer that allows enhancing orientability and achieving a finer particle size in the magnetic recording layer 26, which is formed on the interlayer 20, through enhancement of orientability and through finer particle size in the interlayer 20 itself. The interlayer 20 prevents the formation of an initial layer, undesirable in terms of magnetic characteristics, of the magnetic recording layer 26. Preferably, Ru is used in the interlayer 20 with a view to realizing high perpendicular orientability. The thickness of the interlayer 20 ranges preferably from 1 to 10 nm.

The interlayer 20 is formed on the seed layer 18 by various sputtering methods using a predetermined target. The method used may be, for instance, DC magnetron sputtering. In this case, preferably, the atmosphere in the sputtering device is an argon atmosphere, the pressure in the device ranges from 2.5 to 12 Pa, the temperature in the device is a non-heating temperature, the film formation rate is 2 to 10 nm/second, and the distance between the target and the substrate is 5 to 15 cm.

The hard mask layer 22 is a mask layer that is used when forming irregularities in the interlayer 20. Materials that can be used as the material of the hard mask layer 22 include, for instance, Si, Ti, Ta or oxides or nitrides of the foregoing. Using such materials allows sufficiently reducing the etching rate ratio vis-à-vis the interlayer 20 during the below-described dry etching by ion beam etching, reactive ion etching or the like. As a result, the thickness of the hard mask layer 22 can be made smaller than the thickness of the interlayer 20. Specifically, the thickness of the hard mask layer 22 ranges preferably from 1 to 5 nm, in terms of shortening the etching time during hard mask stripping, and in terms of leaving the etching stop layer 16 intact.

The hard mask layer 22 is formed on the interlayer 20 by various sputtering methods, using a predetermined target.

The method used may be, for instance, DC magnetron sputtering. In this case, preferably, the atmosphere in the sputtering device is an argon atmosphere, the pressure in the device ranges from 0.5 to 2 Pa, the temperature in the device is a non-heating temperature, the film formation rate is 1 to 5 nm/second, and the distance between the target and the substrate is 5 to 15 cm.

The resist 24 is a layer formed on the hard mask layer 22, for forming a below-described resist pattern, in order to selectively shape the hard mask layer 22 only at the protrusions of the uneven pattern of the interlayer 20. As the material of the resist 24 there can be used a photosensitive resin having a photopolymerizable monomer as a main component. Using such a material is advantageous in that the material affords good formability during pattern transfer by imprinting. Preferably, the thickness of the resist 24 ranges from 100 to 1000 nm, since that thickness range allows ensuring sufficient pattern height across the entire surface of the substrate.

The resist 24 is formed on the hard mask layer 22 by spin coating or the like. The various conditions when using spin coating include, preferably, using a UV-curable resist by Toyo Gosei Co., Ltd., spin coating at 1000 to 2000 rpm for 30 to 60 seconds, using atmospheric air as a baking atmosphere, and setting a baking temperature profile of 50 to 80° C., with a highest temperature of 80° C. for 120 seconds.

As illustrated in FIGS. 1B and 1C, the second step is a step for obtaining a resist pattern 34 through patterning of the resist 24.

The resist 24 formed in the first step is pre-cured by heating to a temperature not higher than 80° C. The pre-cured resist 24 is then exposed, developed and thermally cured to yield the resist pattern 34. The curing and developing conditions are not particularly limited. During pattern transfer, the resist can be cured by heating or UV irradiation. The heating conditions and the UV irradiation conditions are not particularly limited.

The resist pattern 34 can also be formed by nano-imprinting, in which the pattern of a stamper of quartz or the like, having an uneven design, is transferred to the pre-cured resist 24. The nano-imprinting conditions include, preferably, lowering of pressure down to 10 to 1000 Pa, bringing the resist 24 into contact with the stamper, followed by UV irradiation while under a load of 1 to 50 MPa. During pattern transfer, the resist can be cured by heating or UV irradiation. The heating conditions are not particularly limited, while the UV irradiation conditions involve preferably irradiation of 10 to 100 mJ/cm$^2$ over 10 to 60 sec.

When forming the resist pattern 34 through transfer of a stamper pattern to the resist 24, by nano-imprinting, some residual resist film remains on the recesses of the resist pattern 34 obtained through transfer of an uneven pattern. Therefore, the residual film is removed using, for instance, O$_2$ gas plasma. The conditions during residual film removal include preferably RF power of 50 to 100 W, a substrate bias power of 100 to 200 W, and a pressure of 0.1 to 2 Pa.

During such removal of the residual film there is reduced not only the thickness of the recesses of the resist pattern 34 but also that of the protrusions of the resist pattern 34. Therefore, a desired uneven design is transferred to the resist 24 by means of the above-described quartz pattern, in order to secure the necessary thickness of the resist pattern 34 that is required for the below-described etching of the hard mask layer 22.

As illustrated in FIG. 1D, the third step is a step of obtaining a patterned hard mask layer 32 through etching of the hard mask layer 22 using the resist pattern 34 as a mask.

Dry etching may be used in the third step. The exposed portions of the hard mask layer 22 (FIG. 1C) can be processed by, for instance, reactive ion etching, employing a fluorine-containing gas such as SF$_6$, CF$_4$ or CHF$_3$, and using the resist pattern 34 as a mask. As a result there is obtained the patterned hard mask layer 32 (FIG. 1D) while the surface of the interlayer 20 becomes exposed at predetermined sites.

When using reactive ion etching for processing the hard mask layer 32, the etching conditions involve preferably RF power of 100 to 500 W, a substrate bias of 100 to 300 W and a pressure of 0.1 to 1 Pa. Etching by way of the resist mask results thereby in substantially vertical side walls of the patterned hard mask layer 32.

As illustrated in FIG. 1E, the fourth step is a step of stripping the resist pattern 34. The resist pattern 34 can be stripped using O$_2$ gas plasma. Conditions for stripping the resist pattern 34 involve preferably RF power of 100 to 200 W, a substrate bias of 50 to 100 W and a pressure of 0.5 to 2 Pa. These conditions allow the resist to be selectively stripped from the surface.

The fifth step is a step of obtaining a patterned interlayer 30 through etching of the interlayer 30, using the patterned hard mask layer 32 as a mask, as illustrated in FIG. 1E.

Dry etching may be used in the fifth step. Dry etching may be carried out using O$_2$ gas plasma. Etching conditions involve preferably RF power of 50 to 100 W, a substrate bias of 100 to 200 W and a pressure of 0.1 to 0.5 Pa. These conditions allow the etching side walls to be etched substantially vertically.

When the interlayer 20 comprises a material containing Ru, the interlayer 20 exposed at the gaps in the patterned hard mask layer 32, in FIG. 1D may react with radicals and/or ions in the O$_2$ gas, to form RuO$_4$ that is evacuated, with the interlayer 20 becoming worn down in the process. When the interlayer 20 uses a material containing Ru, therefore, stripping of the resist pattern 34 and processing of the interlayer 20 are preferably carried out simultaneously.

Attention must be paid on the processing speed of the two processes when stripping of the resist pattern 34 and processing of the interlayer 20 are carried out simultaneously. That is, processing of the interlayer 20 goes still after the entire resist pattern 34 has been stripped, when the processing speed of the interlayer 20 containing Ru is slower than the processing speed relating to stripping of the resist pattern 34. In this case, therefore, the patterned hard mask layer 32 is used as a mask during further processing of the interlayer 20.

Preferably used herein is ion beam etching or reactive ion etching employing a Cl$_2$-based gas or F-based gas, as methods that afford higher processing efficiency. These etching methods allow substantially equalizing the processing speed relating to stripping of the resist pattern 34 and the processing speed of the interlayer 20, and controlling thus both processes simultaneously at a high level.

Regardless of whether stripping of the resist pattern 34 and processing of the interlayer 20 are carried out separately or simultaneously, it is difficult to process the interlayer 20, at a high level, down to the boundary between the interlayer 20 and the seed layer 18, owing to poor low selectivity between the 20 and the seed layer 18. As a result, the seed layer 18 and in some cases also part of the etching stop layer 16 may become processed as well during processing of the interlayer 20.

As described above, for instance, NiFeAl, NiFeSi, NiFeNb, NiFeB, NiFeNbB, NiFeMo, NiFeCr, CoNiFe and CoNiFeB can be used in the seed layer 18. Preferably, Ru is used in the interlayer 20. Herein, NiFeAl and the like are materials having a specific crystal structure, either fcc or hcp. At normal temperature and pressure, Ru is a material having an hcp crystal structure, which is a stable crystal structure. By contrast, amorphous materials such as $SiO_2$, $TiO_2$ or $GeO_2$ can be used as the etching stop layer 16.

By selecting the various materials of such an etching stop layer 16, the seed layer 18 and the interlayer 20, therefore, processing speed is caused to decrease abruptly at the etching stop layer 16, even if processing of the interlayer 20 reaches down to the etching stop layer 16. As a result, processing does not advance into the soft magnetic layer 14 provided beneath the etching stop layer 16, and thus the surface of the soft magnetic layer 14 does not become exposed. The surface of the recesses illustrated in FIG. 1E is positioned thereby within an extremely narrow film thickness range, from the top face of the seed layer 18 to the underside of the etching stop layer 16. As a result, the depth of the recesses is substantially uniform all over the stack. This is important for achieving an extremely uniform uneven design all over the stack after formation of the below-described magnetic recording layer 26.

The sixth step is a step of stripping the patterned hard mask layer 32, as illustrated in FIG. 1F. The patterned hard mask layer 32 can be stripped by reactive ion etching using an F-based gas or the like. The conditions for reactive ion etching involve preferably RF power of 100 to 500 W, a substrate bias power of 50 to 100 W and a pressure of 0.5 to 2 Pa. These conditions allow selectively stripping the hard mask from the surface.

The seventh step is a step of forming the magnetic recording layer 26, by forming perpendicular orientation sections 26a on the patterned interlayer 30 and random orientation sections 26b on the seed layer 18, as illustrated in FIG. 1G.

The magnetic recording layer 26 is a layer for recording and reproducing information. The easy axis of magnetization of the magnetic recording layer 26 must be oriented in a direction perpendicular to the substrate surface. To this end, the hcp (0002) plane of the magnetic recording layer 26 is oriented parallelly to the substrate surface.

The material of the magnetic recording layer 26 may comprise at least one element selected from the group consisting of Co, Cr, Pt, Ni and Fe. In particular, the material of the magnetic recording layer 26 has a so-called granular structure in which ferromagnetic crystal particles comprising a Co-containing alloy are surrounded by non-magnetic crystal particles having an oxide as a main component. In such a granular structure, the magnetic particles of Co-containing alloy are isolated from one another by the oxide. As a result, the small magnetic particles are present as independent particles, which allows realizing high recording density at a high level. The term "main component", which does not rule out the presence of other components in small amounts, means that the oxide is present in the non-magnetic crystal particles in a proportion no smaller than about 90 mol %.

As the Co-containing alloy that makes up the ferromagnetic crystal particles in the magnetic recording layer 26 having the above-described granular structure there can be used, for instance, a CoPt base alloy such as CoPtCr, CoPt, CoPtSi or CoPtCrB, or a CoCr base alloy such as CoCr, CoCrTa or CoCrTaPt. Particularly preferred among these are CoPt base alloys, since they allow setting a high magnetocrystalline anisotropy (Ku).

As oxides that make up the non-magnetic particles in the magnetic recording layer 26 having the above-described granular structure there can be used, for instance, $SiO_2$, $Cr_2O_3$, $ZrO_2$, $TiO_2$ and $Al_2O_3$, which have excellent magnetic isolation ability towards the above-described ferromagnetic crystal particles. Particularly preferred among these is $SiO_2$, on account of its excellent magnetic isolation ability.

The average particle size of the crystal particles in the granular structure ranges preferably from 4 to 8 nm. An average particle size no smaller than 4 nm allows ensuring thermostability, depending on the composition, while an average particle size no greater than 8 nm allows reducing noise.

Preferably, the thickness of the magnetic recording layer 26 ranges from 5 nm to 50 nm. Excellent thermostability can be achieved when the thickness is no smaller than 5 nm. When the thickness is no greater than 50 nm, the head magnetic field pervades the entire magnetic film, affording as a result excellent writing characteristics.

The magnetic recording layer 26 (perpendicular orientation sections 26a and random orientation sections 26b) is formed on the patterned interlayer 30 and the seed layer 18 by various sputtering methods using a predetermined target. The method used may be, for instance, DC magnetron sputtering. In this case, preferably, the atmosphere in the sputtering device is an argon atmosphere, the pressure in the device ranges from 0.7 to 4 Pa, the temperature in the device is a non-heating temperature, the film formation rate is 2 to 10 nm/second, and the distance between the target and the substrate is 5 to 15 cm.

Thereby, the magnetic recording layer 26 comprises a layer (perpendicular orientation sections 26a) having perpendicular anisotropy only at sites of remaining protrusions of the patterned interlayer 30, and comprises elsewhere a layer (random orientation sections 26b) having random orientability.

As illustrated in FIG. 1G, the magnetic recording layer 26 exhibits a predetermined stepped design formed by two constituent elements 26a, 26b. As a result, predetermined magnetic characteristics are obtained at the perpendicular orientation sections 26a that stand at a comparatively short distance from the magnetic recording head, not shown, while predetermined magnetic characteristics are not obtained at the random orientation sections 26b that stand at a comparatively long distance from the head.

The eighth step is a step of forming a protective layer 28 on the magnetic recording layer 26, as illustrated in FIG. 1H. In the present invention, this step can be carried out optionally, as the case may require.

The protective layer 28 is formed with a view to preventing corrosion of the magnetic recording layer 26 and preventing damage to the magnetic recording layer 26 when the magnetic head comes into contact with the medium. In the protective layer 28 there can be used a layer having as a main component an ordinarily employed material, for instance any among C (diamond-like carbon), $SiO_2$ or $ZrO_2$. The thickness of the protective layer 28 is preferably of the order of the thickness of ordinary magnetic recording media, for instance 1 nm to 5 nm.

The stack comprising the soft magnetic layer 14, the etching stop layer 16, the seed layer 18, the interlayer 20 and the magnetic recording layer 26, formed in this order on the substrate 12, is transferred from a sputtering device to a vacuum device, where the protective layer 28 can be formed on the magnetic recording layer 26 by CVD. Other methods that can be used, in known ways, for forming the protective layer 28 include, for instance, sputtering using a carbon target, and ion beam. Using CVD or ion beam, in particular, allows achieving a thin protective layer 28 while realizing higher recording density at a high level.

Although not shown in FIG. 1H, a lubrication layer can be formed on the protective layer 28. The lubrication layer is formed with a view to ensuring lubricity between the magnetic head and the medium. In the lubrication layer there can be used lubricants of ordinarily employed materials such as perfluoropolyethers, fluoroalcohols or fluorocarboxylic acids. The thickness of the lubrication layer can be of the order of the thickness of magnetic recording media ordinarily used, for instance 0.5 nm to 2 nm.

The stack having formed thereon the protective layer 28 is removed from the vacuum device. The lubrication layer can be formed then on the protective layer 28 by dipping. The conditions for forming the lubrication layer by dipping involve a pull-up speed of 1 to 5 mm/sec after dipping.

A patterned magnetic recording medium is thus obtained as a result of the above-described series of manufacturing steps illustrated in FIGS. 1A to 1H. Other than formation of the resist 24, and processing of the resist 24, the hard mask layer 22 and the interlayer 20, all the processing steps in the above various steps are so-called dry processing steps. Formation of the layers 14 to 24, 26 and 28, and processing of the layers 20 to 24 are carried out without the stack being taken out into the atmosphere by way of a transport scheme in which a load lock chamber and a reaction chamber are connected together. This allows reducing dust while increasing throughput.

In the present invention, interposing an etching stop layer between a soft magnetic layer and a seed layer allows achieving an uneven pattern of a magnetic recording layer, with high precision, while fully bringing out the inherent characteristics of the soft magnetic layer. The inventions allows, as a result, realizing excellent recording density in the magnetic recording medium. The present invention holds promise, therefore, for the manufacture of patterned magnetic recording media from which ever higher recording density is demanded.

The invention has been described with reference to certain preferred embodiments thereof. It will be understood, however, that modifications and variations are possible within the scope of the appended claims.

This application is based on, and claims priority to, Japanese Patent Application No: 2008-003446, filed on Jan. 10, 2008. The disclosure of the priority application, in its entirety, including the drawings, claims, and the specification thereof, is incorporated herein by reference.

What is claimed is:

1. A method for manufacturing a patterned magnetic recording medium, comprising:
    forming sequentially, on a substrate, a soft magnetic layer, an etching stop layer, a seed layer, an interlayer, a hard mask layer and a resist;
    obtaining a resist pattern by patterning the resist;
    obtaining a patterned hard mask layer by etching the hard mask layer using the resist pattern as a mask;
    stripping the resist pattern;
    obtaining a patterned interlayer by etching the interlayer using the patterned hard mask layer as a mask;
    stripping the patterned hard mask layer; and
    forming a magnetic recording layer by forming a perpendicular orientation section on the patterned interlayer and forming a random orientation section on the seed layer.

2. The method for manufacturing a patterned magnetic recording medium according to claim 1, wherein a non-magnetic material is used in the etching stop layer.

3. The method for manufacturing a patterned magnetic recording medium according to claim 1, wherein an amorphous material is used in the etching stop layer.

4. The method for manufacturing a patterned magnetic recording medium according to claim 1, wherein ion beam etching is used to etch the interlayer, and a material having a lower sputtering yield than a material of the interlayer is used in the etching stop layer.

5. The method for manufacturing a patterned magnetic recording medium according to claim 1, wherein ion reactive etching is used to etch the interlayer, and a non-magnetic material resistant to a reactive gas is used in a material of the interlayer.

6. The method for manufacturing a patterned magnetic recording medium according to claim 1, wherein the thickness of the etching stop layer is no greater than 10 nm.

7. The method for manufacturing a patterned magnetic recording medium according to claim 1, wherein electron beam exposure or imprinting is used to pattern the resist.

8. The method for manufacturing a patterned magnetic recording medium according to claim 1, further comprising forming a protective layer on the magnetic recording layer.

9. The method for manufacturing a patterned magnetic recording medium according to claim 1, wherein dry etching is used to etch at least one of the hard mask layer and the interlayer.

10. The method for manufacturing a patterned magnetic recording medium according to claim 1, wherein stripping of the resist pattern and etching of the interlayer are carried out simultaneously, a material comprising Ru is used in the interlayer, and an $O_2$ gas plasma is used in the etching.

* * * * *